United States Patent
Empl

(10) Patent No.: US 9,394,101 B2
(45) Date of Patent: Jul. 19, 2016

(54) PORTION CAPSULE FOR PRODUCING A BEVERAGE

(71) Applicant: K-FEE SYSTEM GMBH, Bergisch Gladbach (DE)

(72) Inventor: Gunter Empl, Bergisch Gladbach (DE)

( * ) Notice: Subject to any disclaimer, the term of this patent is extended or adjusted under 35 U.S.C. 154(b) by 0 days.

(21) Appl. No.: 14/409,225

(22) PCT Filed: Jun. 18, 2013

(86) PCT No.: PCT/EP2013/062610
§ 371 (c)(1),
(2) Date: Dec. 18, 2014

(87) PCT Pub. No.: WO2013/189923
PCT Pub. Date: Dec. 27, 2013

(65) Prior Publication Data
US 2015/0175347 A1    Jun. 25, 2015

(30) Foreign Application Priority Data

Jun. 18, 2012   (DE) .......................... 10 2012 105 282

(51) Int. Cl.
| | | |
|---|---|---|
| *B65D 85/804* | (2006.01) | |
| *A47J 31/36* | (2006.01) | |
| *A47J 31/06* | (2006.01) | |
| *A23C 9/15* | (2006.01) | |
| *A23F 3/18* | (2006.01) | |
| *A23F 5/26* | (2006.01) | |
| *A23G 1/56* | (2006.01) | |
| *B65B 7/28* | (2006.01) | |

(Continued)

(52) U.S. Cl.
CPC .......... *B65D 85/8046* (2013.01); *A23C 9/1508* (2013.01); *A23F 3/18* (2013.01); *A23F 5/262* (2013.01); *A23G 1/56* (2013.01); *A47J 31/0673* (2013.01); *A47J 31/369* (2013.01); *A47J 31/3695* (2013.01); *B65B 7/2842* (2013.01); *B65B 25/001* (2013.01); *B65B 29/02* (2013.01); *B65B 47/04* (2013.01); *B65D 85/8043* (2013.01); *A23V 2002/00* (2013.01)

(58) Field of Classification Search
CPC .......... B65D 85/8043; B65D 85/8046; B65B 29/02; B65B 7/2842; B65B 25/001; A23G 1/56; A47J 31/0673; A47J 31/369; A47J 31/3695; A23V 2002/00; A23C 9/1508; A23F 3/18; A23F 5/262
See application file for complete search history.

(56) References Cited

U.S. PATENT DOCUMENTS

| | | | |
|---|---|---|---|
| 2,778,739 A | | 1/1957 | Rodth |
| 5,325,765 A | * | 7/1994 | Sylvan et al. ................... 99/295 |

(Continued)

FOREIGN PATENT DOCUMENTS

| | | |
|---|---|---|
| EP | 1344722 A1 | 9/2003 |
| EP | 1710173 A1 | 10/2006 |

(Continued)

*Primary Examiner* — Anthony Weier
(74) *Attorney, Agent, or Firm* — McNees Wallace & Nurick LLC

(57) ABSTRACT

The invention relates to a portion capsule for producing a beverage, having a capsule body, which has a capsule bottom and a lid, wherein a cavity for accommodating a powdery or liquid beverage Substrate is formed between the capsule bottom and the lid and wherein a filter element is arranged in the cavity. The invention further relates to a method for producing a portion capsule and the use of the portion capsule to produce a beverage.

31 Claims, 4 Drawing Sheets

(51) Int. Cl.
*B65B 25/00* (2006.01)
*B65B 29/02* (2006.01)
*B65B 47/04* (2006.01)

(56) References Cited

U.S. PATENT DOCUMENTS

| | | | |
|---|---|---|---|
| 5,352,765 | A | 10/1994 | Drent et al. |
| 7,543,527 | B2 * | 6/2009 | Schmed .......................... 99/295 |
| 2003/0172813 | A1 | 9/2003 | Schifferle |
| 2006/0236871 | A1 * | 10/2006 | Ternite et al. ................... 99/295 |
| 2007/0148290 | A1 * | 6/2007 | Ternite et al. ................... 426/90 |
| 2009/0211713 | A1 * | 8/2009 | Binacchi ....................... 156/423 |
| 2010/0196545 | A1 * | 8/2010 | Buffet et al. .................... 426/79 |
| 2012/0070543 | A1 | 3/2012 | Mahlich |
| 2012/0070551 | A1 * | 3/2012 | Mahlich ........................ 426/433 |

FOREIGN PATENT DOCUMENTS

| | | |
|---|---|---|
| EP | 1792850 A1 | 6/2007 |
| EP | 2218653 A1 | 8/2010 |
| JP | H04176311 A | 6/1992 |
| WO | 2010137952 A1 | 12/2010 |
| WO | 2011147591 A1 | 12/2011 |
| WO | 2012038063 A1 | 3/2012 |
| WO | 2013171663 A1 | 11/2013 |

* cited by examiner

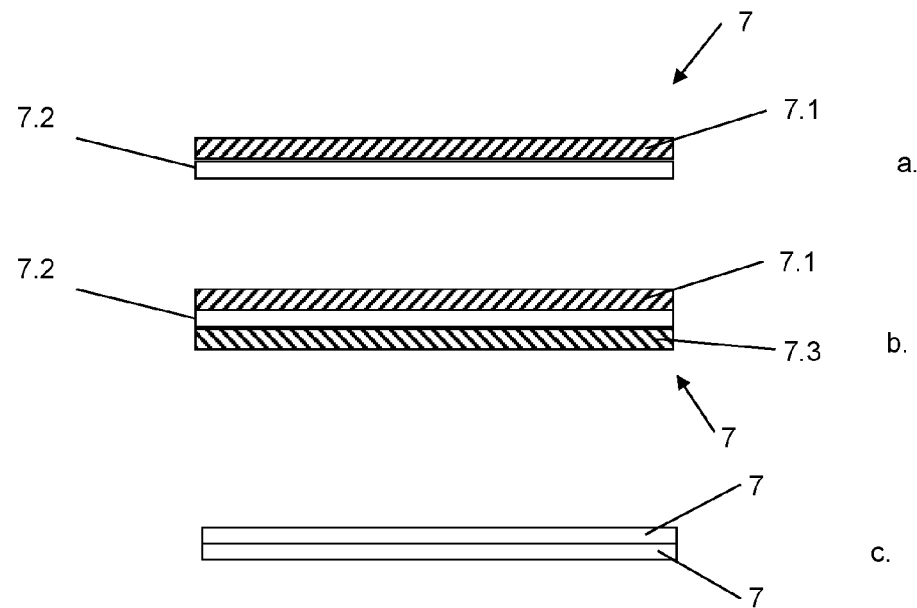
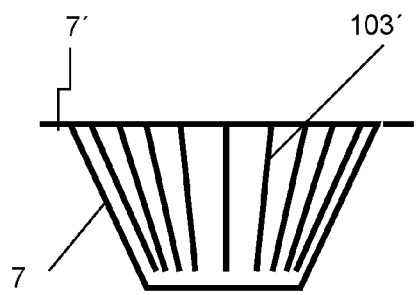
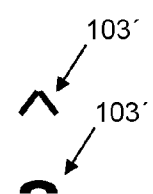
Fig. 8
Fig. 9a    Fig. 9b
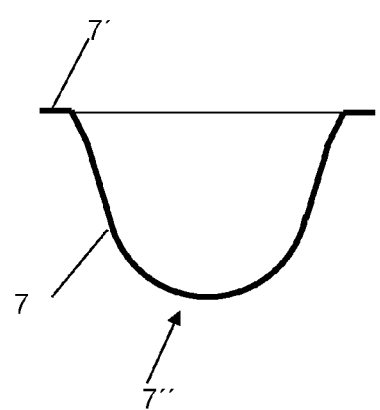
Fig. 10

PORTION CAPSULE FOR PRODUCING A BEVERAGE

The present invention relates to a serving capsule for preparing a beverage comprising a capsule body with a capsule base and a lid, wherein between the capsule base and the lid there is a cavity for accommodating a granular, powdery or liquid beverage substrate, and wherein a filter element is situated between the beverage substance and the capsule bottom. Furthermore, the present invention relates to a process for the manufacture of a portion capsule as well as the use of the portion capsule for making a beverage.

Such portion capsules are well known in the prior art. For example, in publications EP 1792850 B1, EP 1344722 A1, WO 2012/038063 A1 and US 2003/0172813 generic portion capsules for coffee and espresso preparation are revealed.

Such dose capsules for producing a beverage or food product are preferably frustoconical or cylindrical in shape and can be made using a thermoformed plastic film or plastic injection moulding process. They typically have a closed capsule bottom and an open filling side with a collar edge upon which, after the cavity of the portion capsule is fitted with a filter element and filled with a granular, powdery or liquid beverage substrate, a covering film is sealed or bonded. The filter element is preferably situated between the beverage substrate and the capsule base and is supported on this. These filter elements are either injection moulded from a thermoplastic material or thermoformed from a plastic film or embossed or made of a woven or non-woven material and prevent particles from the beverage substrate from entering the beverage being made.

For the preparation of a beverage, such as a coffee beverage, the portion capsule is placed in the brewing chamber of a preparation device. During or after closing of the brewing chamber, the capsule is preferably opened, preferably on its bottom side by means of a so-called brewing spike in the brewing chamber, and after sealing of the brewing chamber with a sealing film, the filling side of the portion capsule is preferably pierced by means of a brewing spike. There are also portion capsules that are already open on at least one side before they are introduced into the preparation device. Subsequently, a preparation liquid, preferably hot water, is conveyed under pressure into the portion capsule. The preparation liquid flows through the substrate, and extracts and/or dissolves the substances required for the preparation of the beverage from the beverage substrate. For the preparation of an espresso, for example, a preparation liquid pressure of up to 20 bars acts to extract the essential oils from the coffee powder. This pressure also has an effect on the particle screen which lies between the coffee powder and the capsule bottom and in front of the pierced capsule outlet.

A disadvantage of sieves produced by plastic injection moulding, deep drawing or embossing processes is, however, that for retention of the coffee particles, the opening of the sieve holes must be smaller than the smallest coffee particles. Since for example a certain fine particle content is inevitable from the coffee grinding process, screen holes that are too large result in large coffee particles passing through, and screen holes that are too small result in clogging of the screens, particularly at high pressures. Furthermore, supports between the screen and the capsule bottom are necessary to prevent deformation of the screen due to the high brewing water pressure and temperature, and to avoid having the brewing spike penetrate or pass through the filter element. These particular support elements are disadvantageous, particularly for injection moulded screen assemblies due to additional required materials, thereby increasing the manufacturing cost.

Therefore, portion capsules with screen assemblies which avoid these disadvantages are known in the prior art. In U.S. Pat. No. 2,778,739, EP 1710173 A1 and U.S. Pat. No. 5,352,765, portion capsules with screen assemblies are revealed which consist of a filter holder with relatively large openings which are covered with a filter material. The disadvantage of these arrangements is that additional material and manufacturing costs arise, since they consist of a stable filter holder and the filter material placed in the filter holder and/or the area available for the filter is too small such that the extraction or dissolution process lasts a relatively long time.

It is thus the objective of the present invention to make available a portion capsule with a filter assembly which can be more cost-effectively manufactured than the prior art and which at the same time avoids the disadvantages demonstrated in connection with the prior art.

This objective is achieved through a portion capsule for production of a beverage, comprised of a capsule body with a capsule bottom and a lid, whereby between the capsule bottom and the lid, a cavity for accommodation of a powdery or liquid beverage substrate is provided and a filter element is situated in the cavity, and the filter element is made using a non-woven fabric that is formed from plastic, preferably deep-drawn.

Deep-drawn within the context of the present invention means that a formerly flat filter element is given a 3D shape with at least one indentation or protrusion.

The statements made regarding the present invention apply to the other embodiments of the present invention equally and reciprocally.

Compared to the prior art, the portion capsule according to this invention has the advantage that a simple and inexpensive filter mesh is used as a filter screen. This material is formed from plastic, preferably deep-drawn, is not flat, and as a result has a comparatively larger filter area than a flat filter element, and which in particular is larger than the cross-sectional area of the capsule body to which it is attached.

Compared to the plastic filters known from the prior art, a filter made from a non-woven fabric also has the advantage that it has a significantly larger liquid inflow surface. Furthermore, cross-flow of the liquid (parallel to the main filter plane) is made possible, thereby providing better mixing and draining. In addition, it has been found that when using a filter, the risk of clogging of the screen mesh is significantly reduced or virtually eliminated. Surprisingly, the filter mesh proves to be clog-resistant for both beverage preparation under comparatively low pressure as well as under comparatively high fluid pressure. Furthermore, a liquid cross flow in the filter fabric is always reliably maintained, ensuring outflow of the liquid entering the filter mesh to the drain opening.

According to the present invention, the portion capsule preferably consists of a hermetically sealed portion capsule. This means that the beverage or food powder contained in the portion capsule, such as for example coffee grounds, soup powder or tea, is substantially sealed against the environment in an aroma-tight manner. The portion capsule does not need to be hermetically sealed, but may also be provided in a hermetically sealed package, which can then be opened manually. Such portion capsules are usually opened on at least one, preferably two, sides, i.e., the preparation liquid can be caused to flow through the capsule without being pierced.

Preferably, the nonwoven fibrous material is a mesh. A mesh according to the present invention is a random, non-woven structure made of fibres, in particular plastic fibres. A mesh according to the present invention preferably contains no paper or paper-like materials, but is rather completely made of plastic.

According to another embodiment of the present invention, the mesh consists of a nonwoven mesh made of fine synthetic fibres, for example fine polyester fibres, which is in particular a special fibre and/or fibre-based nonwoven mesh. The nonwoven mesh preferably has a mass density (also called grammage or weight per unit area) of between 20 and 140 grammes per square meter, more preferably of between 60 and 80 grammes per square meter, and most preferably of 70 grammes per square meter. The filter element or nonwoven mesh preferably has a thickness of between 0.2 and 0.8 millimeters, more preferably of between 0.3 and 0.35 millimeters, and most preferably of 0.32 millimeters. The mesh is formed so that the air permeability of the nonwoven mesh at 100 pascals is preferably between 1000 and 3000 $l/m^2$ s, particularly preferably between 1500 and 2500 $l/m^2$ s and most preferably 2000 $l/m^2$ s is. It has been surprising and unforeseen that with such nonwoven meshes optimal results in terms of extraction efficiency, mixing and draining, as well as clogging resistance can be achieved and still form the "Crema".

According to another aspect or another embodiment of the present invention, the filter element has a felt structure. In particular, it involves a needle felt structure. Preferably, the filter element consists of at least one felt structure and a support structure, in particular a fabric structure, whereby, more preferably at least a portion of the volume consists of the felt structure. Preferably, the felt extends over the entire cross section of the support structure, most preferably however over only a portion of the height. Preferably, the felt structure interlocks, is force-locked, or is firmly bonded to the support structure. Preferably, the filter element has two or more felt structures which are preferably separated from each other by the support structure. The thickness of the two felt structures may be identical or different. Preferably the felt structure facing the powder/grounds or tea is thinner than the felt structure facing the bottom of the capsule or vice versa. Preferably, the surface of the felt is treated, for example heat treated, to capture, for example, loose fibres. Preferably, the filter element having a felt structure is inserted only in the capsule, and in particular the bottom thereof. However, the filter element can also be connected to the capsule, in particular firmly bonded to the bottom thereof. The perforation means may penetrate this filter element. Preferably, multiple filter elements having one or more felt structures and a support structure are arranged within the capsule one above the other, and interconnected if necessary.

A support structure, in particular a fabric structure, and a filter element with a felt structure, can be produced for example using a fabric structure consisting of longitudinal and transverse threads. For the construction of a felt, in particular a needled felt, fibre units are selected from preferably 0.8-7 dtex. The binding together of the individual fibres to form a felt and/or its anchorage in the support structure preferably takes place using the production process of needling. In this case, the needles are inserted with reverse barbs into the prepared fibre package at a high speed and withdrawn. By the barbs, the fibres consist of multiple loops emerging from each other and/or intertwined with the carrier fabric.

The support element with one or more felt structures has a mass density (also called grammage or basis weight) between 100 and 1200 grammes per square meter, more preferably 150 to 1150 grammes per square meter, and most preferably 150-250 grammes per square meter for the production of tea and 600-1200 grammes per square meter for the production of coffee, espresso or the like. The filter element or nonwoven fabric preferably has a thickness 0.8 to 3.3 millimeters, particularly preferably 1.1 to 3.0 millimeters, and most preferably, from 1.2 to 1.4 mm for the production of tea and 2.6-3.0 for the manufacture of coffee.

According to the invention the fibre material is plastically formed for the manufacture of the filter element, particularly deep-drawn. Thereby, this flat fibre material is given a three-dimensional form, for example as a strip, sheet, bow or plate. Plastic forming, particularly deep-drawing, of the nonwoven fibrous material is preferably carried out using pressure and/or heat treatment. Preferably, a punch will be pressed into a die for this purpose. The fibrous material is then located between the punch and the die and is thereby shaped or for example deep-drawn. After the plastic is formed, the filter element takes on its three-dimensional form (3D-shape). Through plastic forming, particularly deep-drawing, the fibrous material forms a space which can be filled with the beverage or food substrate. To those skilled in the art, it was amazing that the fibre material can be plastically deformed, particularly deep-drawn, without losing its filtering properties. According to another preferred embodiment of the present invention, the flat fibre material is embossed. Plastic forming can however be accomplished by any other forming method known to those skilled in the art.

The filter element, i.e. for example the mesh or felt material is connected, according to a preferred or another embodiment of the present invention, with the side wall of the portion capsule or with the collar edge, in particular by welding, for example using ultrasound or by gluing, before the capsule body is filled with the beverage substrate.

The statements made regarding this embodiment of the present invention apply to the other embodiments of the present invention equally and reciprocally.

According to another or preferred embodiment of the present invention, the filter element is attached, preferably by welding but also for example with ultrasound or adhesive, to the collar edge of the portion capsule, i.e. with the flange which preferably projects horizontally from the sidewall of the portion capsule, preferably before the capsule body is filled with the beverage substrate. Preferably the outer edge of the filter element is also designed as a flange which rests on the collar edge of the portion capsule for this purpose. The diameter of the filter element is preferably the same or smaller, preferably slightly smaller, than the outer diameter of the collar edge. Preferably, in this embodiment, the covering film is attached to the filter element, preferably with its edge, by means of gluing or welding, for example. Attachment of the covering film with the filter element can occur simultaneously or staggered in time with attachment of the filter element to the portion capsule, wherein preferably the filter element is first attached to the portion capsule and then the covering film is fixed to the filter element. It was extremely surprising and unexpected to those skilled in the art that this embodiment can be hermetically sealed.

The statements made regarding this embodiment of the present invention apply to the other embodiments of the present invention equally and reciprocally.

Preferably, the filter element is designed to be spaced apart from the capsule base, i.e. at least before the liquid is applied to the substrate, it does not touch the capsule base. Particularly preferably, the filter element never touches the capsule bottom. This embodiment has the advantage that the filter element cannot be damaged during piercing of the portion capsule.

Preferably, the side wall of the filter element is basically cylindrical or frusto-conical, and has for example a basically flat, elliptical, or hemispheric bottom. Preferably, in particular, the sidewall has a zig-zag or wavelike shape. Preferably the side wall of the filter element does not completely rest on the side wall of the portion capsule prior to injection of the liquid into the portion capsule, whereby, particularly preferably, the pressure of the liquid increases the area of contact between the sidewall of the filter element and the sidewall of the portion capsule. Thereto the bottom of the filter element is preferably elevated.

The capsule body is preferably formed frusto-conical or cylindrical in shape and is for example made of plastic, a natural substance and/or a biodegradable material and/or a metallic material, of a thermoformed plastic foil or made using a plastic injection moulding process. The material from which the capsule body is manufactured can be multi-layered. The capsule body preferably or according to the present embodiment has a collar edge on the filling side, upon which a covering foil can be directly or indirectly sealed or glued. Alternatively, it is plausible that the capsule body and a capsule cover are attached to each other by means of a mechanical process. The bottom of the portion capsule is preferably closed and is preferably first perforated in the brewing chamber by means of a perforating means which acts from the exterior onto the portion capsule bottom for the purpose of creating a discharge opening. Alternatively, it would likewise be conceivable that the bottom of the portion capsule is already provided with a discharge opening at the place of manufacture, which is preferably sealed by means of a sealing film. The sealing film is then for example perforable by means of the perforating means or can be pulled away from the capsule bottom by hand. The filter element is preferably tear-resistant. The sealing film is preferably a plastic film which has at least a barrier layer, for example a metallic layer, preferably an aluminium layer or an aluminium oxide layer. Alternatively a purely plastic film with a barrier layer for the flavour substances of the beverage to be prepared can be used as a sealing film. The plastic film preferably has a "peel layer" on the side of it which faces the capsule, in order to be able to remove the plastic film relatively easily from the capsule bottom.

The discharge opening is preferably large enough that it can accommodate a perforating means (as applicable) without contact. It is particularly preferable that the discharge opening is so large that no appreciable loss of pressure from the finished beverage occurs, also that no appreciable turbulence is caused within the finished beverage as it flows out, both of which could cause an entry of gas into the beverage and thereby lead to the production of foam.

Alternatively, the capsule bottom material rests upon the perforating means after piercing takes place. The finished drink flows between the perforating means and the material within the capsule. Thereby an intentional loss of pressure and/or intentional turbulence can produce a "crema" in the case of coffee.

According to another preferred embodiment of the present invention, the filter element is of elastic design. If the capsule bottom is pierced with an external perforation means, the filter element can yield or stretch due to its elasticity upon contact with the perforation means, such that a perforation of the filter element is prevented. Thus the risk that the filter element will be perforated by the perforation means and that the unfiltered beverage substance will be flushed from the unfiltered portion of the capsule is eliminated.

A fixed spacing between the filter element and the capsule bottom is preferred.

According to another preferred embodiment of the present invention, the filter element is stretched, pierced and/or penetrated by the perforating means.

According to another embodiment or preferred embodiment of the present invention, the filter element is fixed to the capsule body or onto the collar edge, whereby the filter element in particular is attached by sealing or gluing. Advantageously, slipping of the filter element within the portion capsule is thereby hindered. Furthermore, undesired flowing of the liquid around the filter element is prevented. This attachment is preferably performed by means of ultrasonic welding.

According to another preferred embodiment of the present invention, the capsule bottom has a bulge in a direction opposite to the filling side. Advantageously, the bulge serves to receive the perforating means, such that while the capsule bottom in the region of the bulge is perforated upon insertion of the perforating means, the perforating means subsequently remains in the cavity of the bulge. Perforation of the filter element is thereby prevented. Particularly in this embodiment, lifting of the filter element by the perforating means is not necessary.

According to another form or another embodiment of the present invention, the filter element is designed such that upon perforation of the capsule bottom by an external piercing means, the filter element is at least partly lifted off the capsule bottom. In this manner, a perforation of the filter element through the perforation means is effectively prevented.

According to a further embodiment of the present invention the capsule bottom has a predetermined breaking point and is intended to tear open as a result of a mechanical contact with an external perforation means, wherein the predetermined breaking point is preferably arranged in multiple radial lines of weakness around a central point on the capsule bottom. The lines of weakness in the capsule bottom preferably have a reduced material strength and/or are perforated along the lines of weakness. Advantageously, perforation of the capsule bottom occurs when a predetermined breaking point is reached. This has the additional advantage that a less sharp perforation point can be used for perforating the capsule bottom, so that the risk of damage to the filter element during the lifting of the filter element is reduced. In this case a blunt perforating means is sufficient for perforating the capsule bottom.

According to a further embodiment, the capsule bottom has a permanent outlet opening, which is preferably sealed with a film, and said film preferably has a peel tab for peeling the film off by hand. A perforation of the capsule bottom by means of an external perforating means is here advantageously not required. Before inserting the portion capsule into the brewing chamber, the film is easily removed by means of the pull tab from the capsule bottom and the brewing process can be started. The combination of a pre-made, and thus comparatively large output port with a filter element made of mesh, felt, needled felt, foam or sponge material has the advantage that the beverage liquid does not flow at high pressure from the output port and thus the formation of foam ("crema") is avoided, particularly for the manufacture of coffee or tea.

A further preferred embodiment or embodiment according to the present invention is a portion capsule in which the filter element has a filter area and an attachment portion, whereby the attachment portion is at an angle from the filter area.

The statements made regarding this embodiment of the present invention apply to the other embodiments of the present invention equally and reciprocally.

According to the invention, the filter element has a filter area and a connecting portion. In the connecting portion, the filter element is connected, in particular by sealing, to the capsule body or the capsule bottom. The finished beverage is passed through the filter area. According to the invention, the connecting portion and the filter area are designed to be at an angle to each other. For example, the connecting portion of the filter element lies on the conical inner surface of the capsule body and the filter area is parallel or curved with respect to the bottom of the portion capsule.

This embodiment is particularly suitable for the production of tea.

A paper material or a paper-like material can preferably be used as a filter material, which preferably is at least partially coated with a plastic so that it is sealable.

A further preferred embodiment according to the present invention is a portion capsule in which the filter element has a filter area which is curved.

The statements made regarding this embodiment of the present invention apply to the other embodiments of the present invention equally and reciprocally.

The filter area is preferably set at a distance away from the capsule bottom, particularly so spaced from the capsule bottom that the filter area does not contact a possibly provided piercing spike and is not pierced by the same and/or that the filter area touches a discharge opening in the capsule bottom.

This embodiment is particularly suitable for the production of tea.

A paper material or a paper-like material can preferably be used as a filter material, which preferably is at least partially coated with a plastic so that it is sealable.

Yet another embodiment or preferred embodiment of the present invention is a portion capsule wherein the filter element has at least one fold in its connecting portion.

The statements made regarding this embodiment of the present invention apply to the other embodiments of the present invention equally and reciprocally.

According to this embodiment of the present invention, the filter element has at least one, preferably several, folds in the region in which the filter element is attached to the capsule body or capsule bottom, preferably by sealing. The folds preferably differ from each other in their shape and/or size and/or are found at irregular intervals on the periphery of the filter element. Preferably, the overlapping areas of the fold attach to each other upon sealing. Preferably the fold rests on the connecting portion of the filter element.

Preferably the folds are come about in such a manner that a flat filter element can be placed in the capsule body without it plastically deforming. Despite the folds and the overlaps associated with it, the connecting portion of the filter element can be firmly attached to the capsule body such that the filter element is not damaged.

This embodiment is particularly suitable for the production of tea.

A paper material or a paper-like material can preferably be used as a filter material, which preferably is at least partially coated with a plastic so that it is sealable.

Yet another embodiment or preferred embodiment of the present invention is a portion capsule wherein the filter element has at least one multilayered region.

The statements made regarding this embodiment of the present invention apply to the other embodiments of the present invention equally and reciprocally.

According to the present invention, the filter element in its connecting portion (i.e. in the region where the filter element is connected to the capsule body or capsule bottom preferably by sealing) has at least one, preferably multiple multilayered regions. Preferably the multilayered region has three layers of filter material. The multilayered portions preferably differ from each other in their shape and/or size and/or are set at irregular intervals on the periphery of the filter element. Preferably the layers of the multilayer region are fixed to each other by means of sealing.

Preferably the multilayered areas are created such that a flat filter element can be inserted into the capsule body with it plastically deforming. Despite the multilayer areas and the associated overlaps, it is possible to firmly attach the filter element to the capsule body without damaging the filter element.

This embodiment is particularly suitable for the production of tea.

A paper material or a paper-like material can preferably be used as a filter material, which preferably is at least partially coated with a plastic so that it is sealable.

Preferably, paper is one component of the filter element.

Another embodiment of the present invention is a capsule wherein the filter element has a polygonal periphery, preferable hexagonal.

The filter element is preferably sealed to the capsule bottom such that the sealing seam is particularly preferably in the shape of an annular ring. Preferably the average diameter of the annular ring is 22-25 mm.

Another object of the present invention is a process for the manufacture of a portion capsule with a filter element made of a non-woven fibre material in which the filter element is plastically formed or preferably deep-drawn from a planar material, preferably a product web or a sheet, plate or the like.

The disclosure made regarding this embodiment of the present invention applies to the other embodiments of the present invention equally and reciprocally.

Preferably, the filter element is cut or die-cut before or after moulding, particularly preferably introduced by the knife into the capsule, and there preferably spaced apart from the capsule base, attached to the capsule body or the collar edge, and then the portion capsule is filled with the beverage or food substrate and the capsule is then sealed with a cover film.

Particularly preferably, the cover film is fixed to the filter element. This takes place after the portion capsule is filled with the beverage or food substrate.

Preferably the filter element which has been cut out is moved at least a certain distance from the knife or particularly the hollow knife which was used to cut it. Preferably, the filter element which has been cut out is further moved and/or pressed onto the capsule, particularly its side wall or collar edge, using a sonotrode, which is required for ultrasonic welding.

Another object of the present invention is a procedure for the manufacture of a portion capsule with a filter element made of a non-woven fibre material in which a planar filter element is inserted into a portion capsule with a punch, and thereby formed and then fixed to the capsule body, particularly by sealing.

The disclosure made regarding this embodiment of the present invention applies to the other embodiments of the present invention equally and reciprocally.

In the procedure according to the present invention, a filter element, disc-shaped for example, is pushed by a punch into the capsule body. Thereby the filter element is deformed such that a part of the filter element rests on the capsule body. Preferably the entire filter element is pushed in, but only far enough that a free space remains between the filter element and the capsule bottom. After the filter element is pushed into the capsule, it is attached to the capsule body or to the collar edge, preferably by sealing. Prior to sealing, the filter element is preferably relaxed. In particular, the portion which is to later become the filter portion is to be relaxed. Thereby, for example, the pressure which the punch exerts on this region can be reduced.

Another embodiment of the present invention is the use of a portion capsule for producing a beverage, preferably for producing a coffee, cocoa, tea and/or milk beverage or a food, in particular a soup.

The statements made regarding this embodiment of the present invention apply to the other embodiments of the present invention equally and reciprocally.

Embodiments of the invention are illustrated in the figures and explained in greater detail in the description below. The figures are merely described by way of example and do not limit the general inventive concept. The description applies equally to all embodiments of the present invention.

FIGS. 8a, 8b, 8c show different embodiments of the filter element with felt, especially needled felt.

FIGS. 9a, b show an embodiment of a deep-drawn filter element.

FIG. 10 shows a further embodiment of a deep-drawn filter element.

Figure 11:
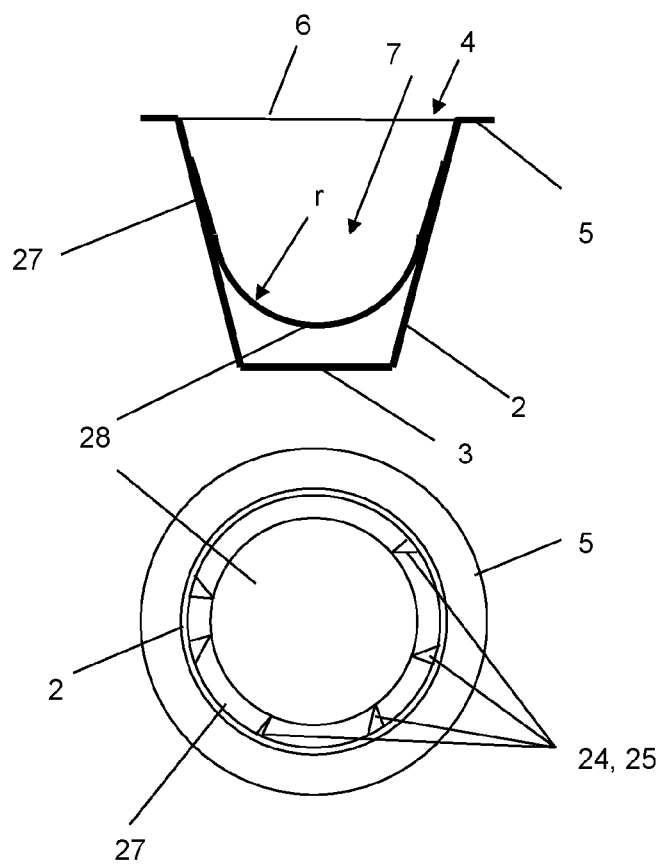

FIG. 11 shows a further embodiment of the filter element according to the present invention.

In the various figures, identical parts are always provided with the same reference numerals and will therefore also generally be named or mentioned only once.

Figure 1:
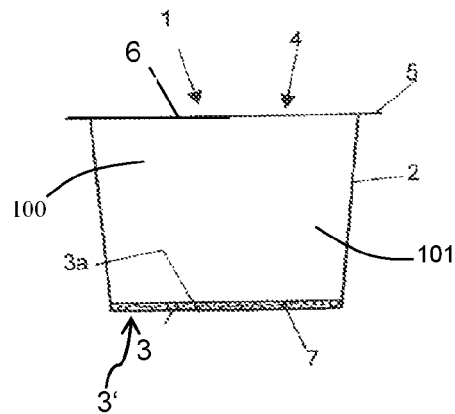
FIG. 1 shows a longitudinal section through a portion capsule according to a first embodiment of the present invention, which is set up for the preparation of espresso.

In FIG. 1, a first embodiment of the portion capsule 1 according to the present invention is shown. The portion capsule 1 comprises a frusto-conical capsule body 2 with a closed bottom 3 and a collar edge 5 arranged on its filling side 4, upon which a cover film 6 is welded or glued. Between the capsule bottom 3 and the cover film 6 is a preferably air- and aroma-tight closed cavity 100 which is filled with a powdery and granular beverage substance 101. The beverage substance 101 consists of for example a coffee, cocoa, tea and/or milk powder (or granules). On the inner side 3a of the closed capsule body bottom 3, i.e. within the cavity 100, there is a filter element 7, consisting of a non-woven fibre material. The filter element is deep-drawn, i.e. is not flat. The filter element 7 lies either loosely on the inside 3a of the capsule bottom 3 or is fixed, i.e. adhesively connected to the inside 3a of the capsule body bottom 3. In the second variation, the filter element 7 in particular is only adhesively fixed to the capsule bottom 3 in an edge region 3' of the capsule bottom 3. The filter element preferably consists of fine polyester fibres. The fibres are preferably thermally calendered with each other, for example many extruded polyester fibres are arranged on and next to each other and then bonded by means of heated rollers (flat calendered). The nonwoven fabric comprises a random fibre and/or fibre-based nonwoven fabric. The mesh preferably has a mass density (also known as gramme weight or weight per unit area) of between 40 and 100 grammes per square meter, more preferably between 60 and 80 grammes per square meter, and most preferably of generally 70 grammes per square meter. The filter element or mesh preferably has a thickness between 0.20 and 0.8 millimeters, particularly preferably between 0.25 and 0.39 millimeters, and most preferably of generally 0.32 millimeters. The mesh is formed such that the air permeability of the mesh at 100 Pascals is preferably between 1000 and 3000 $l/(m^2 \, s)$, particularly preferably from 1500 to 2500 $l/(m^2 \, s)$, and most preferably generally 2000 $l/(m^2 \, s)$. The mesh is also preferably configured such that the maximum tensile force is 67 Newtons per 5 centimeters in the longitudinal direction, 110 Newtons per 5 cm in the transverse direction, the elongation at maximum force in the longitudinal direction is 30 percent and 38 percent in the transverse direction.

Figure 2:
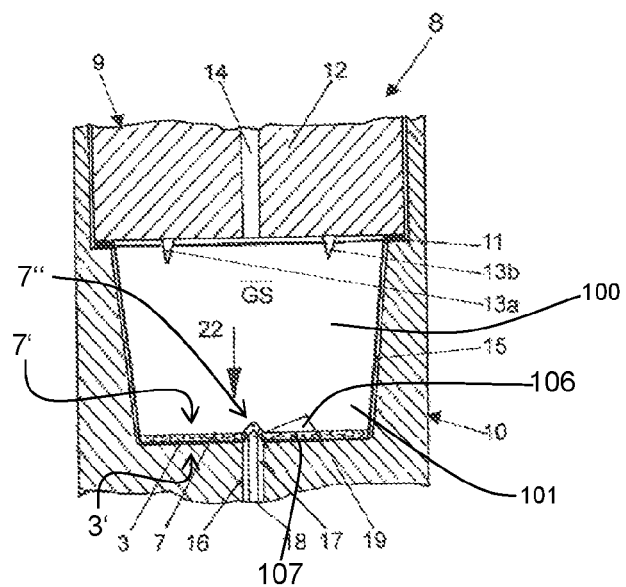
FIG. 2 shows a longitudinal section through a portion capsule lying in a closed brewing chamber, according to the first embodiment of the present invention

A portion of the capsule 1 according to the first embodiment illustrated in FIG. 1 of the present invention is shown in FIG. 2, wherein the portion of the capsule 1 is arranged in FIG. 2 in a closed brewing chamber 8. The brewing chamber 8 consists of a first brewing chamber element 9 and a second brewing chamber element 10, wherein the first brewing chamber element 9 is provided for the introduction of one portion capsule movable relative to the second brewing chamber element 10 or vice versa. Between the two brewing chamber elements 9, 10, there is a seal 11. The first brewing chamber element 9 essentially consists of a locking piston 12 with piercing elements 13a, 13b for opening of the cover film 6 on the portion capsule 1, a preparation liquid supply 14 and the seal 11. The second brewing chamber element 10 consists essentially of the portion capsule 1 partially surrounding the brewing ladle holder 15 with a brewing spike 16 at the bottom of the brewing ladle holder 15, which is provided with drainage grooves 17 and a beverage outlet 18. For receiving the portion capsule 1, the brewing chamber 8 is located in a non-illustrated open condition in which the first and second brewing chamber elements 9, 10 are spaced apart in order to allow insertion of the portion capsule 1 and the closed state (shown) in which a preparation process for the preparation of a beverage by means of the portion capsule 1 can be carried out. When closed, the brewing chamber 8 is pressure sealed. During transfer of the brewing chamber 8 from the opened state to the illustrated closed position, the cover film 6 is pierced by the piercing elements 13a, 13b, so that the preparation liquid, in particular hot brewing water, is passed through the brewing liquid supply 14 under pressure into the cavity 100 of the portion capsule 1. Further, during closing of the brewing chamber 8 the capsule bottom 3 is perforated brewing spike 16 perforation means, so that an outlet opening is formed 107 in the portion capsule 1, from which the beverage liquid produced from the portion of the capsule 1 emerges in the direction of the beverage flow 18. The brewing spike 16 on its outer surface, and the flow grooves 17 support guidance of the beverage liquid. In the representation, the capsule bottom 3 of the portion capsule 1 in the brewing chamber 9, 10 is pierced by the brewing spike 16 of the second brewing chamber but the filter element 7 above the injection site is slightly raised from the insertion tip 19 of the brewing spike 16, but is however not pierced. This is achieved in particular through the central region 7' not being integrally connected with the capsule bottom 3, but the filter element 7 is integrally connected only in the edge area 3' of the capsule bottom 3 with the capsule bottom 3, so that in consequence of the mechanical contact with the top of the brewing spike 16 it is simply lifted from the capsule bottom 3 and thus remains unperforated (i.e. is not perforated by the brewing spike 16). In the edge region 3' of the capsule bottom 3 or in the edge portion 7' of the filter element 7, the bottom 3 of the capsule and the filter element 7 remain connected to each other in contact, and in particular interlock with each other, so that no beverage substance 101 passes around the filter element 7 and through the beverage outlet 18. The capsule bottom 3 has at its central point 106, in which the capsule bottom 3 is perforated by the brewing spike 16, optionally a breaking point 104, so that a comparatively blunt brewing spike 16 for perforating the capsule bottom 3 is sufficient, and so the risk of inadvertently perforating the filter element 7 with the brewing spike 16 is removed.

Figure 3:
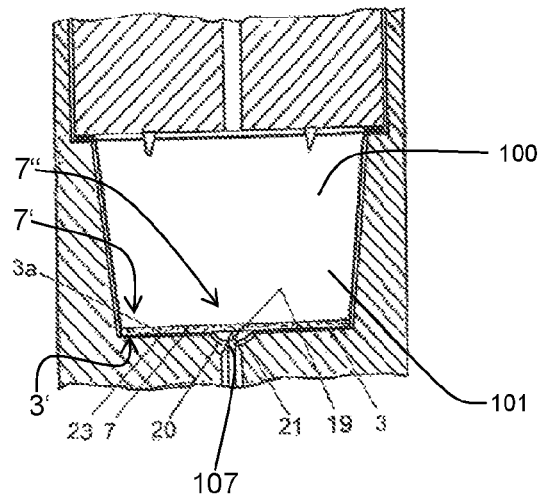
FIG. 3 shows a longitudinal section through a portion capsule lying in a closed brewing chamber according to a second embodiment of the present invention.

In FIG. 3, a portion capsule 1 is illustrated in accordance with a second embodiment of the present invention, whereby the second embodiment is substantially that which is illustrated in FIG. 2 and is similar to the first embodiment. The portion capsule 1 is also shown in a closed brewing chamber 8. In contrast with the first embodiment, however, the portion capsule bottom 3 upon piercing with the brewing spike 16 has a bulge 21 directed towards a recess 20 in the brewing chamber bottom 3a (the bulge 21 is thus directed opposite to the filling side 4) in which the brewing spike 16 pierces without penetrating the filter element 7. Lifting of the filter element 7 from the capsule bottom 3 is in particular not required. For preparation of the beverage, the brewing chamber 8 is in turn closed after insertion of the portion capsule 1 into the brewing chamber 8. During the closing operation of the cover film 6, the portion of the capsule 1 is perforated by the piercing means 13a, 13b, and after completion of joining and sealing the first and second brewing chamber elements 9, 10 (via the gasket 11), the brewing water is injected through the liquid inlet 6. Likewise during the closing operation of the brewing chamber of, the brewing spike 16 pierces an opening in the bottom 3 of the capsule 1. The temperature above the injection site at the filter element 7 is adjusted in thickness and tear resistance to the penetration depth of the piercing tip 19 of the brewing spike 16 so that the filter element 7 is not penetrated. Alternatively, the filter element 7 is located on the bulge 21 of the capsule bottom 3 which is located in the indentation of the brewing ladle holder bottom 23 and the brewing spike 16 stands only in the bulge 21 of the capsule 3 and the bottom does not reach the filter element 7. The liquid then flows, for example, in the preparation of coffee, as hot water into the capsule 1. Within the capsule, this liquid flows through the beverage substance 101 and extracts and/or dissolves the necessary substances for the beverage from the beverage substance 101. The flow of the fluid through the beverage substance 101 is illustrated by the reference numeral 22. Thereafter, the resulting beverage flows through the beverage substrate 101 on the capsule bottom 3 of the filter element 7, which prevents the components of the beverage substance 101 from entering the resulting beverage in particle form, the brewing spike 16 pierces the capsule bottom 3 and the beverage flows through the drainage grooves 17 to a receptacle such as a cup or pot.

Figure 4A:
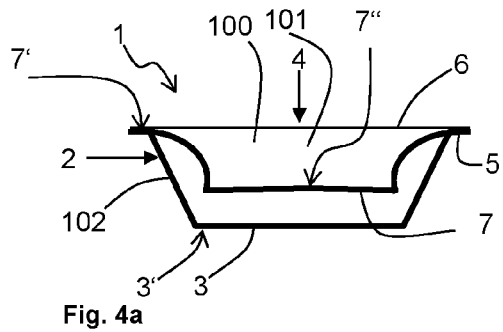
FIGS. 4a, 4b show schematic sectional views of a portion capsule according to a third embodiment of the present invention.
Figure 4B:
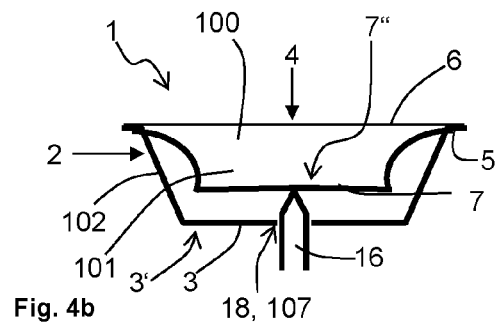

FIGS. 4a and 4b show schematic cross-sectional image views of a portion of the capsule 1 according to a third embodiment of the present invention. In the present embodiment, the filter element is preferably made of a non-woven fibrous material and particularly deep-drawn, i.e. the originally flat fibre material of the filter element is given a three-dimensional form. In its edge region 7', according to the present embodiment, the filter element is attached to the collar edge 5 of the capsule body. This attachment can be accomplished for example by sealing or adhesion. Through fixing of the filter element 7 to the collar edge of the capsule body, a free space exists between the central area 7" of the filter element and the filter bottom 3, in which a piercing spike 16 can penetrate into the portion capsule without piercing the filter element. In any case the central area 7" of the filter element is deformed by piercing spike due to its elasticity. Preferably, the portion capsule is closed by means of a cover film 6 which, particularly preferably, is attached to the edge area of the filter element, for example through sealing or gluing.

Figure 5A:
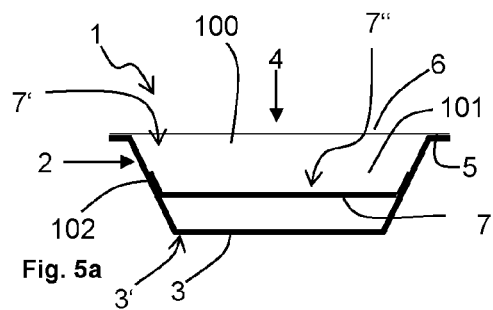
FIGS. 5a, 5b are schematic sectional image views of a portion capsule according to a fourth embodiment of the present invention.
Figure 5B:
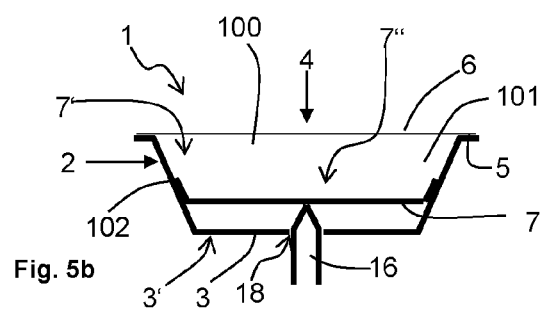

In FIGS. 5a and 5b, schematic sectional views of a portion capsule 1 according to a fourth embodiment of the present invention are shown, wherein reference is made to the third embodiment (cf. FIGS. 4a, b). In the present embodiment, the edge region 7' of the filter is attached to the side wall of the capsule body, for example by sealing or adhesively. The cover film 6 is attached directly to the collar edge of the capsule body in the present embodiment. Otherwise, reference is made to the explanations of FIGS. 4a, b. In the present embodiment, the filter element is likewise preferably deep-drawn.

Figure 6A:
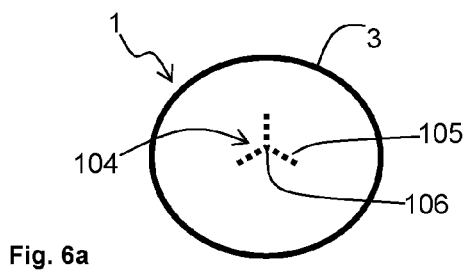
FIGS. 6a, 6b show schematic plan views of a portion capsule bottom according to a seventh embodiment of the present invention.
Figure 6B:
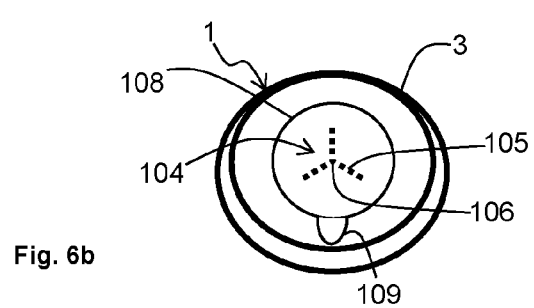

In FIGS. 6a and 6b, a view of a capsule bottom 3 of a portion capsule 1 according to a sixth embodiment is shown, wherein reference is made to each of the previous embodiments. The portion capsule 1 is shown from "below" in FIG. 6. In this view, the optional breaking point 104 can be seen, which here comprises three lines of relative weakness 105 which are arranged radially in a star shape around the central point 106 on the capsule bottom 3. Along the lines of weakness 105, the capsule bottom 3 has a reduced material strength and/or the capsule bottom 3 is preperforated, in order to make a perforation in the brewing chamber 8 easier. So that the flavour of the beverage substrate 101 can be stored for longer periods even with a preperforated capsule bottom 3, the capsule bottom 3 is preferably sealed with a perforable film or a film which can be removed by hand 108. The film 108 is affixed for example to the outer side of the capsule bottom 3 and has a pulling tab 109 which is not affixed to the capsule bottom 3 and by means of which the film 108 can be removed by hand. An embodiment with lines of weakness 105 in the form of perforations in the capsule bottom 3 as well as with a film 108 is illustrated in FIG. 6b by way of example.

Figure 7:
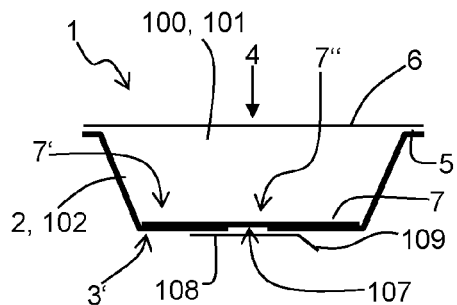
FIG. 7 shows a cutaway view of a portion capsule according to an eighth embodiment of the present invention.

In FIG. 7, a cutaway view of a portion capsule 1 is shown according to an eighth embodiment of the present invention. The eighth embodiment is generally identical to the first embodiment shown in FIG. 1, but can also be combined with any other of the embodiments illustrated. The portion capsule 1 of the eighth embodiment is provided with a permanent outflow opening 107 in the capsule bottom 3 which in the initial position is sealed with the film 108. The portion capsule 1 thus has no predetermined breaking points. The film 108 likewise has a pulling tab 109 for removal of the film 108 by hand. No perforation of the capsule bottom 3 by means of an external perforation means is in the design. Rather, upon insertion of the portion capsule 1 in the brewing chamber 8, the film 108 is easily removed from the capsule bottom 3 by means of the pulling tab 109 and the brewing process can then be started directly and without perforation of the capsule bottom 3.

FIGS. 8 a-c show different embodiments of a filter element 7 with a felt structure 7.1, in particular a needle felt structure. This filter element 7 preferably has a support structure 7.2, for example a fabric structure. On and/or in this fabric structure 7.2 on the entire surface which faces the coffee grounds or tea there is a felt structure 7.1 which is connected, for example, by needle felting with the fabric, as shown in FIG. 8a.

The embodiment of FIG. 8b has two felt structures 7.1 and 7.3, which are respectively arranged on and/or in the support structure. Both structures preferably extend over the entire cross section, that is, over the entire circular surface of the filter element. The felt structures 7.1 and 7.3 may be of the same or different thicknesses. Preferably, the felt 7.1 is thinner than the layer 7.3 or vice versa. The carrier layer is then with laid upon the centre of the filter element, based on the thickness. Structures 7.1 and 7.3 can be made of different or the same material(s). These affect not only the substance from which they are made, but also the thread diameter and/or length of thread from which the felt structures are made. Between the two structures 7.1 and 7.3, a support structure 7.2 is provided in which there is no or little felt structure and which preferably permits cross-flow.

FIG. 8c shows yet another embodiment of a filter element having felt structure. In the present case two filter elements 7 having a felt structure such as those described, for example, as shown in FIGS. 12a and b, are emplaced one above the other. The filter elements 7 can only lie on each other or be joined together. The filter elements 7 may also be of felt without a support structure.

All filter elements with a felt structure have the advantage that they have a low pressure loss, or that the pressure drop along the filter element has a low gradient. This permits, for example, coffee without crema, i.e. foam, as well as tea made without foam. The filter elements with a felt structure are preferably inserted only in the capsule. Preferably, the filter element has the felt with a larger diameter than the bottom of the capsule so that it presses the edges against the wall of the capsule.

Preferably, the filter element with a felt structure is made entirely out of PET.

The person skilled in the art will recognise that the filter element 7 is not limited to the form illustrated herein, but rather can take on any shape, particularly a 3-D form. In particular, the filter element according to FIGS. 8 a-c can also be deep-drawn.

In FIGS. 9a and 9b, a deep-drawn filter element is shown. In the present embodiment this has a conical side wall and a flange-like collar in its edge region 7' which can be connected to the collar edge 5 of the portion capsule body. The cover film 6 of the portion capsule can also be affixed to the edge region 7'. In the present embodiment, indentations 103' in the form of channels are engraved in the side wall of the filter element. Upon preparation of the beverage, the filter element is pressed in the direction of the side wall of the portion capsule and comes in at least partial contact with the same or at least sections of the side wall of the filter element rest from the outset on the side wall of the capsule body. The side wall of the capsule body and the indentation 103' comprise a channel through which the finished beverage flows out. The person skilled in the art will recognise that the indentations extend over the entire extent of the side wall of the filter element and particularly preferably are equidistant from each other. This results in a corrugated or pleated section 103'. As can be gathered in particular from FIG. 9b, the channel 103' can have a triangular or partially circular cross-section.

FIG. 10 also shows an embodiment of a deep-drawn filter element. Generally, reference can be made to the embodiment according to FIG. 9, wherein in the present embodiment the bottom is designed as a spherical bottom and the side wall is conical in shape, wherein the degree of taper of the side wall preferably varies, preferably increasing towards the opening of the filter element. The side wall may, if necessary, have indentations 103'.

FIG. 11 shows a further embodiment of the portion capsule according to the present invention in a side view and in a plan view. Once again, the portion capsule 1 comprises a frusto-conical capsule body 2 with a closed capsule bottom 3 and a collar edge 5 on its filling side 4 to which a cover film 6 is welded or adhesively bonded. The capsule base can be provided with a relatively large opening, in particular a circular opening, which is closed for example by means of a peelable film. In the interior of the portion capsule there is a filter element 7 which has a connecting region 27 and a filter region 28. In the connecting region 27, the filter element is connected with the capsule body 2, particularly by sealing, i.e. under heat and/or pressure treatment. The finished beverage liquid will flow through the filter region. It can be clearly seen that between the capsule base and the filter element, a spacing is provided which is preferably so large that the filter element does not touch the capsule base when it is under pressure or under the influence of the liquid. Also preferred is that the spacing is large enough that a possible opening spike situated in the brewing chamber (e.g. FIGS. 4 b, 5 b) does not touch the filter element. In the present embodiment, the filter region has a curvature represented by the radius r. The person skilled in the art recognises that the curvature does not need to be that a circular arc. Preferably the filter element is made of a material that is primarily paper or a material similar to paper. This material, or at least sections of this material, should preferably be coated with a sealing plastic material so that the filter element can be connected to the capsule body by sealing. The portion capsule is preferably manufactured such that the filter element is a flat, for example circular, disc which is pressed into the portion capsule by means of a punch until the connecting region 27 of the filter element 7 lies on the capsule body. The filter element will however only be pressed into the portion capsule so far as to allow the spacing between the filter element and the capsule bottom to remain. Subsequently, the filter element is sealed to the capsule body by heat and pressure treatment, for example by means of a heated punch. Prior to sealing, the load on the filter region 28 of the filter element is preferably relieved. This can be done for example so that the punch has two parts and the lower part of the punch is pulled upward, opposite to the direction of motion of the punch. Thereby the load on the filter region 28 will be removed, without reducing the pressure on the connecting region.

The lower part of FIG. 11 shows the portion capsule according to the invention after the filter element has been connected with the capsule body. It can be clearly seen that in the connecting region 27 there are many folds 24 and/or multi-layered regions 25, wherein the folds 24 or multi-layered regions 25 preferably differ in shape and/or size and their spacing to one another preferably differs, wherein their shape is generally triangular. Moreover it can be seen that the folds 24 or multilayer regions 25 rest against the connecting region and the positions of the folds are connected to one another by means of sealing.

REFERENCE NUMERAL LIST

1 Portion capsule
2 Capsule body
3 Capsule bottom
3a Capsule bottom-inside
3' Edge region of the capsule base
4 Filling side 5 Collar edge
6 Cover, cover film
7 Filter element
7' Edge region of the filter element
7" Central region of the filter element
7.1 Felt structure, needle felt structure
7.2 Support structure
7.3 Felt structure, needle felt structure
8 Brewing chamber
9 First brewing chamber element
10 Second brewing chamber element
11 Seal
12 Closing piston
13a Piercing element
13b Piercing element
14 Preparation liquid inlet
15 Ladle holder
16 Perforation means/brewing spike
17 Outlet grooves
18 Outlet
19 Piercing means
20 Indentation
21 Indentation/bulge
22 Preparation liquid flow
23 Ladle holder bottom
24 Fold
25 Multi-layer region
27 Connecting region
28 Filter region
100 Cavity
101 Drinks substrate
102 Sidewall area
103 Indentation, corrugated or folded area
104 Target breaking point
105 Lines of weakness
106 Central point
107 Aperture, output aperture
108 Foil
109 Pull tab
r Radius of curvature of the filter surface

The invention claimed is:

1. Portion capsule (1) for preparing a beverage, comprising a capsule body (2) with a capsule bottom (3) and a lid (6), wherein between the capsule bottom (3) and the lid (6), a cavity (100) for receiving a powdered or liquid beverage substrate (101) is formed in the cavity, and wherein a filter element (7) is situated and the filter element is made of nonwoven fibre material, the fibre material is plastically formed, deep-drawn, the filter element is elastic.

2. Portion capsule (1) according to claim 1, characterised in that the filter element, spaced apart from the capsule bottom (3), is connected to the capsule body (2).

3. Portion capsule (1) according to claim 1, characterised in that the filter element is spaced apart from the capsule bottom (3) and connected to a collar edge (5).

4. Portion capsule (1) according to claim 1, characterised in that the filter element comprises a filter region (28) and a connecting portion (27) and that the connecting region is set at an angle to the filter region.

5. Portion capsule (1) according to claim 1, characterised in that the filter element comprises a filter region (28) which is curved.

6. Portion capsule according to claim 1, characterised in that the filter element has at least one fold (24) in a connecting region.

7. Portion capsule according to claim 1, characterised in that the filter element has at least one multi-layer region (25) in a connecting region.

8. Portion capsule according to claim 1, characterised in that the filter element is polygonal.

9. Portion capsule according to claim 4, characterised in that it comprises a plurality of folds (24) or a plurality of multilayer portions (25).

10. Portion capsule according to claim 1, characterised in that paper is a component of the filter element.

11. Portion capsule according to claim 1, characterised in that the filter element is a a felt structure.

12. Portion capsule (1) according to claim 11, characterised in that a mesh comprises a nonwoven fabric made of polyester fine fibres and/or that the web has a mass density between 40 and 100 grammes per square meter and/or that the nonwoven has a thickness between 0.20 and 0.8 millimeters and/or that the mesh has an air permeability at a pressure of 100 Pascal of between 1000 and 3000 l/(m$^2$ s).

13. Portion capsule according to claim 11, characterised in that the filter element (7) has two felt structures (7.1, 7.3).

14. Portion capsule (1) according to claim 1, characterised in that the filter element (7) on the capsule body (2) or on the collar edge (5) is sealed to the capsule.

15. Portion capsule (1) according to claim 1, characterised in that a lid (6) is sealed to the filter element (7).

16. Portion capsule (1) according to claim 1, characterised in that the diameter of the filter element (7) is greater than the diameter of the capsule bottom (3).

17. Portion capsule (1) according to claim 1, characterised in that the filter element (7) has a region (7') which protrudes substantially in the direction of the filling side (4), and/or is bent in the direction of the filling side (4).

18. Portion capsule (1) according to claim 17, characterised in that the region (7') extends at least partially along a side wall portion (102) of the capsule body (2), wherein the sidewall region extends between the filling side (4) and the capsule bottom (3).

19. Portion capsule (1) according to claim 1, characterised in that the capsule bottom (3) has an indentation (21) in the direction of the filling side (4).

20. Portion capsule (1) according to claim 1, characterised in that the capsule bottom (3) is formed such that for a perforation of the capsule bottom (3) by an external perforation means (16), the filter element (7) remains unperforated.

21. Portion capsule (1) according to claim 1, characterised in that the filter element (7) has a corrugated or folded portion (103') which acts as a fluid channel.

22. Portion capsule (1) according to claim 1, characterised in that the capsule bottom (3) has a predetermined breaking point (104) which is intended to tear open as a result of a mechanical contact with an external perforation means (16).

23. Portion capsule (1) according to claim 22, characterised in that the predetermined breaking point (104) comprises a plurality of lines of weakness (105) radiating from a central point (106) on the capsule bottom (3), wherein the capsule bottom (3) has a reduced thickness and/or is perforated.

24. Portion capsule (1) according to claim 1, characterised in that the capsule bottom (3) has an outlet opening (107).

25. Portion capsule according to claim 1, characterised in that the filter element is sealed to the capsule bottom, wherein the sealing seam is an annular ring.

26. Portion capsule according to claim 25, characterised in that the average diameter of the annular ring is 22-25 mm.

27. Use of a portion capsule (1) according to claim 1 for producing a beverage, for preparing a coffee, cocoa, tea and/or milk beverage.

28. Portion capsule for preparing a beverage, comprising a capsule body with a capsule bottom and a lid, wherein between the capsule bottom and the lid, a cavity for receiving a powdered or liquid beverage substrate is formed in the cavity, and wherein a filter element is situated and the filter element is made of non-woven fibre material, the fibre material is plastically formed and deep drawn, the filter element has a region which protrudes substantially in the direction of the filling side, and/or is bent in the direction of the filling side.

29. Portion capsule for preparing a beverage, comprising a capsule body with a capsule bottom and a lid, wherein between the capsule bottom and the lid, a cavity for receiving a powdered or liquid beverage substrate is formed in the cavity, and wherein a filter element is situated and the filter element is made of non-woven fibre material, the fibre material is plastically formed and deep drawn, the capsule bottom has an indentation in the direction of a filling side.

30. Portion capsule for preparing a beverage, comprising a capsule body with a capsule bottom and a lid, wherein between the capsule bottom and the lid, a cavity for receiving a powdered or liquid beverage substrate is formed in the cavity, and wherein a filter element is situated and the filter element is made of non-woven fibre material, the fibre material is plastically formed and deep drawn, the capsule bottom has a predetermined breaking point which is intended to tear open as a result of a mechanical contact with an external perforation means, the predetermined breaking point having a plurality of lines of weakness radiating from a central point on the capsule bottom, wherein the capsule bottom has a reduced thickness and/or is perforated.

31. Portion capsule for preparing a beverage, comprising a capsule body with a capsule bottom and a lid, wherein between the capsule bottom and the lid, a cavity for receiving a powdered or liquid beverage substrate is formed in the cavity, and wherein a filter element is situated and the filter element is made of non-woven fibre material, the fibre material is plastically formed and deep drawn, the filter element is sealed to the capsule bottom, wherein the sealing seam is an annular ring.

* * * * *